(12) United States Patent
Tamaru

(10) Patent No.: US 9,326,106 B2
(45) Date of Patent: Apr. 26, 2016

(54) CONTENTS OPEN SYSTEM, PORTABLE TERMINAL, SERVER, AND NON-TRANSITORY COMPUTER READABLE MEDIUM

(71) Applicant: FUJIFILM Corporation, Tokyo (JP)

(72) Inventor: Masaya Tamaru, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 159 days.

(21) Appl. No.: 14/039,678

(22) Filed: Sep. 27, 2013

(65) Prior Publication Data

US 2014/0029504 A1    Jan. 30, 2014

Related U.S. Application Data

(63) Continuation of application No. PCT/JP2012/055172, filed on Mar. 1, 2012.

(30) Foreign Application Priority Data

Mar. 31, 2011    (JP) .................................. 2011-080899

(51) Int. Cl.
  *H04W 4/06*       (2009.01)
  *H04N 21/81*      (2011.01)
(52) U.S. Cl.
  CPC ............... *H04W 4/06* (2013.01); *H04N 21/812* (2013.01)
(58) Field of Classification Search
  CPC .............................. H04W 40/22; H04W 88/04
  See application file for complete search history.

(56) References Cited

U.S. PATENT DOCUMENTS

| 2006/0155762 | A1* | 7/2006 | Lee et al. .................... 707/104.1 |
| 2007/0150609 | A1  | 6/2007 | Lehrer et al. |
| 2008/0109249 | A1* | 5/2008 | Paulson et al. .................... 705/1 |
| 2008/0208963 | A1* | 8/2008 | Eyal et al. ..................... 709/203 |
| 2010/0004988 | A1  | 1/2010 | Matsuo |

FOREIGN PATENT DOCUMENTS

| JP | 2002-298006 A | 10/2002 |
| JP | 2004-214846 A | 7/2004 |
| JP | 2005-086608 A | 3/2005 |
| JP | 2005-236598 A | 9/2005 |
| JP | 2007-519096 A | 7/2007 |
| JP | 2008-244813 A | 10/2008 |
| JP | 2009-276934 A | 11/2009 |
| WO | WO 2010/027714 A2 | 3/2010 |

OTHER PUBLICATIONS

International Search Report, issued in PCT/JP2012/055172, dated, Mar. 27, 2012.

* cited by examiner

*Primary Examiner* — Hassan Kizou
*Assistant Examiner* — Ashil Farahmand
(74) *Attorney, Agent, or Firm* — Birch, Stewart, Kolasch & Birch, LLP

(57) ABSTRACT

When a user A of a terminal a sets to open image data, open data information relating to the image data is transmitted to a server 200, thereafter, when a terminal b enters the communication area X of the terminal a, image data and the ID thereof are transmitted to the terminal b from the terminal a, ID of the image data and receiving terminal information are transmitted to the server 200 from the terminal b and the receiving terminal information is recorded in a pair with open data information, thereafter, receiving terminal information is transmitted to the server 200, every time image data is transmitted between terminals 100, and is recorded in a pair with open data information.

13 Claims, 13 Drawing Sheets

(a)   (b)

CONTENTS OPEN SYSTEM, PORTABLE TERMINAL, SERVER, AND NON-TRANSITORY COMPUTER READABLE MEDIUM

CROSS REFERENCE TO RELATED APPLICATION

This is a continuation of International Application No. PCT/JP2012/055172 filed on Mar. 1, 2012, and claims priority from Japanese Patent Application No. 2011-080899, filed on Mar. 31, 2011, the entire disclosures of which are incorporated herein by reference.

TECHNICAL FIELD

The present invention relates to a contents open system, and a portable terminal, a server, and a non-transitory computer readable medium.

BACKGROUND ART

In the portable terminals using a mobile communication network for communication, there are also portable terminals having an ad hoc communication function for direct communication between portable terminals without a mobile communication network. A system designed to improve an advertisement effect by delivering advertisement information from an advertisement delivery terminal installed at a store to portable terminals in the communication range of the advertisement delivery terminal using the portable terminals and then by transmitting the advertisement information to a plurality of non-specific portable terminals in relay by means of ad hoc communication between portable terminals has been proposed (see Patent Literature 1).

Further, those disclosed in Patent Literatures 2 to 4 have been known as technologies relating to the ad hoc communication.

CITATION LIST

Patent Literature

[Patent Literature 1] JP-A-2002-298006
[Patent Literature 2] JP-A-2004-214846
[Patent Literature 3] JP-A-2008-244813
[Patent Literature 4] JP-A-2005-236598

SUMMARY OF INVENTION

Technical Problem

It is possible to delivery information to several non-specific people by transmitting information between the systems or portable terminals described in any one of Patent Literatures 1 to 4. However, the user who provides information cannot know how the information is transmitted, in the systems.

The present invention has been made in consideration of the above-mentioned problems, and an object thereof is to provide a contents open system that may simply open contents to several non-specific portable terminals and provide a service that may provide useful information about the person who provides contents, and a portable terminal, a server, a terminal program and a server program which are used in the system.

Solution to Problem

The present invention is directed to a contents open system comprising a server and a plurality of portable terminals each having a network communication unit that communicates with the server through a mobile communication network, thereby opening contents data to several non-specific people using the plurality of portable terminals, wherein the plurality of portable terminals comprises: an inter-terminal communication unit configured to directly communicate with another portable terminal (hereafter, referred to as another terminal) without using the mobile communication network; a contents information transmission control unit configured to transmit contents information which is information on contents data set to be opened by a user of the corresponding terminal and includes the ID of the contents data, to the server; a first contents transmission control unit configured to, when another terminal is in the communication area of the inter-terminal communication unit, transmit the contents data set to be opened and the ID of the contents data to the another terminal in the communication area through the inter-terminal communication unit; a terminal information transmission control unit configured to receive content data set to be opened by another terminal and the ID of the contents data from another terminal through the inter-terminal communication unit, and then, when a predetermined condition for the received information are satisfied, transmit terminal information about the corresponding terminal and the ID of the received contents data to the server; and a second contents transmission control unit configured to, when another terminal is in the communication area of the inter-terminal communication unit in a state of receiving contents data set to be opened by another terminal, transmit the contents data and the ID of the contents data to the another terminal in the communication area through the inter-terminal communication unit, and the server comprises: a contents information registering unit configured to register the contents information transmitted from the portable terminal on a database; a terminal information recording unit configured to record the terminal information received from the portable terminal and the terminal information in the ID of the contents data on the database, in a pair with contents information including the same ID as the ID of the received contents data registered on the database; and an information returning unit configured to return information recorded on the database in a pair with requested contents data or information obtained by processing the information to the portable terminal, in accordance with a request from the portable terminal.

The portable terminal of the present invention is the portable terminal in the contents open system.

The server of the present invention is the server in the contents open system.

The terminal program of the present invention is a program that makes a computer available for other functions than the inter-terminal communication unit and the network communication unit of the portable terminal in the contents open system.

The server program of the present invention is a program for making a computer available for each of the parts of the server in the contents open system.

Advantageous Effects of Invention

According to the present invention, it is possible to provide a contents open system that can simply open contents to several non-specific portable terminals and provide a service that can provide useful information about the person who provides contents, and also a portable terminal, a server, a terminal program, and a server program which are used in the system.

DESCRIPTION OF EMBODIMENTS

Hereinafter, embodiments of the present invention will be described with reference to the drawings.

Figure 1:
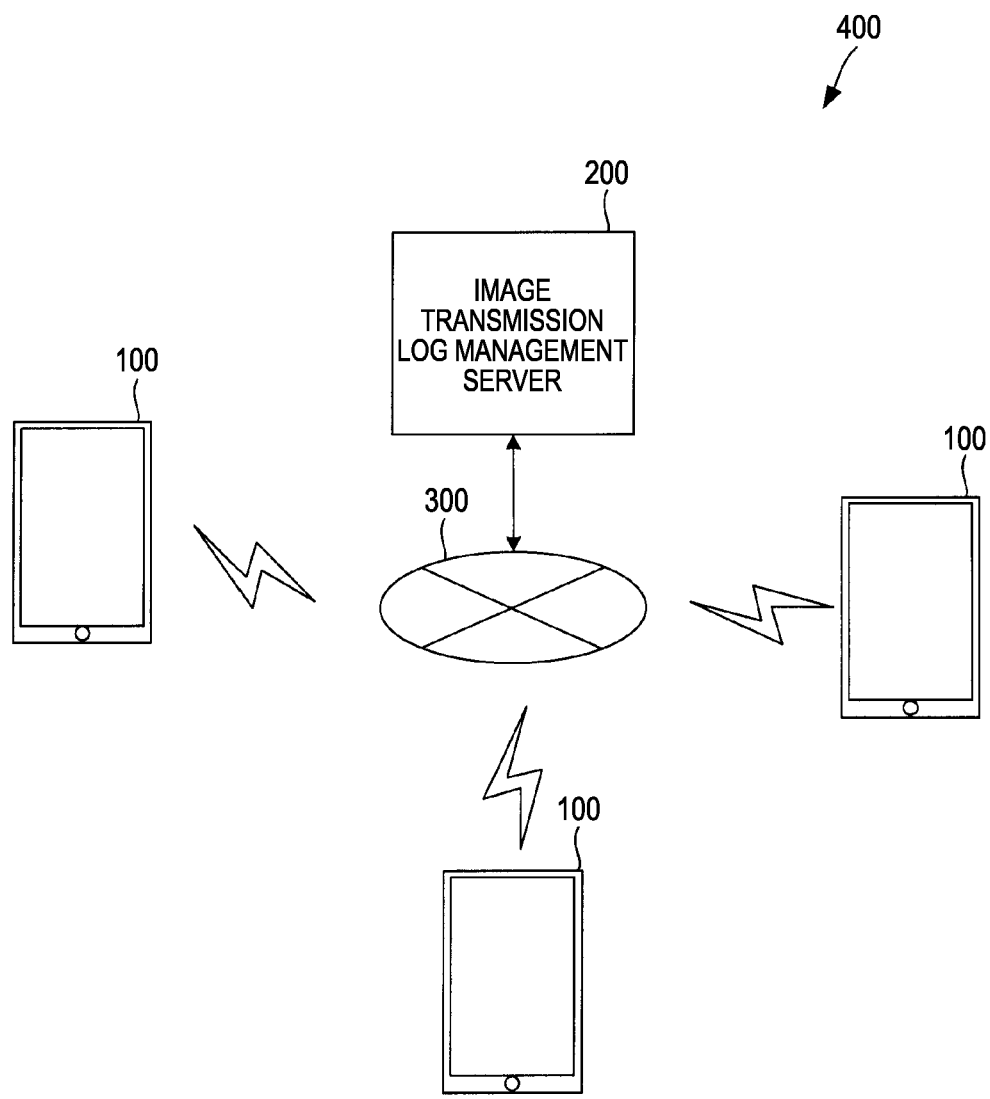
FIG. 1 is a diagram illustrating a schematic configuration of a contents open system 400 for describing an embodiment of the present invention.

FIG. 1 is a diagram illustrating a schematic configuration of a contents open system 400 for describing an embodiment of the present invention.

The contents open system 400 includes an image transmission log management server 200 and a plurality of portable terminals 100 that may communicate with the image transmission log management server 200 through a mobile communication network 300. The contents open system 400 may open contents data, such as still image data, moving image data, and moving image data with voice, to a plurality of non-specific people, using the portable terminals 100. The portable terminals 100 are, for example, digital cameras or mobile phones with a camera.

Figure 2:
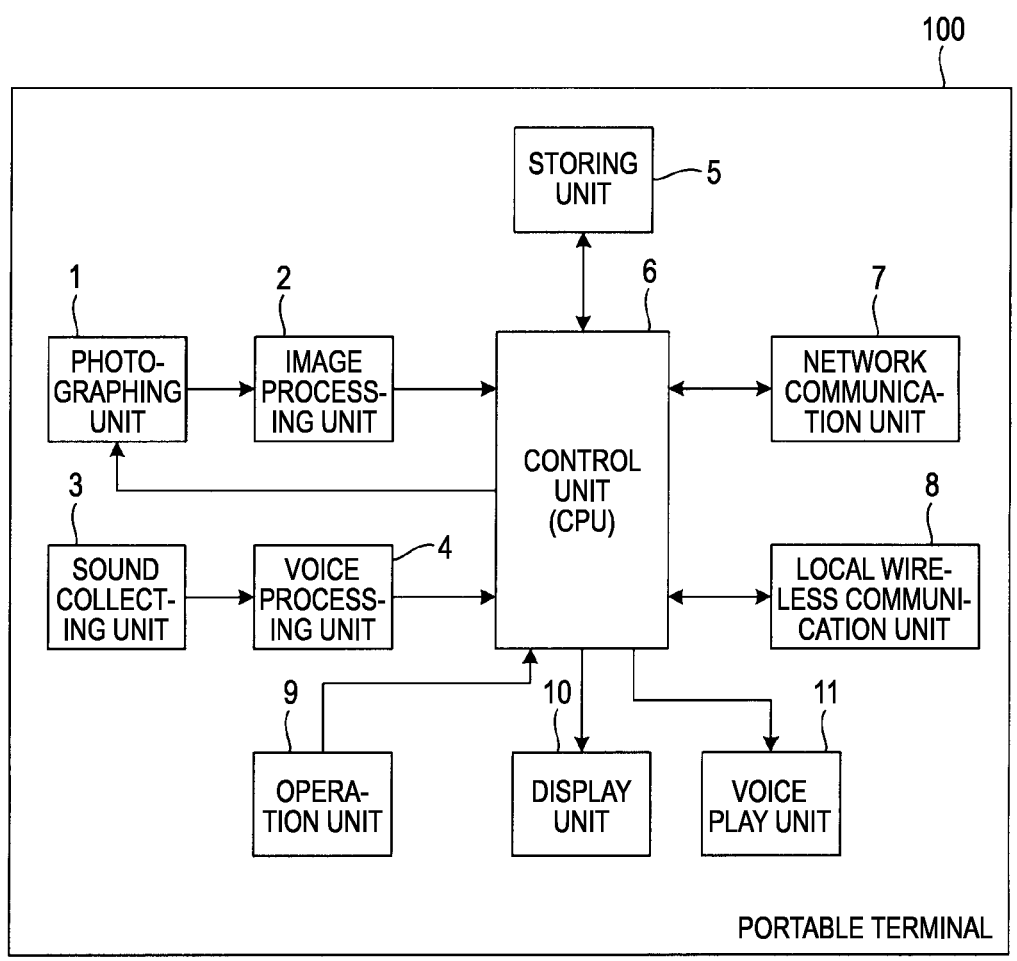
FIG. 2 is a diagram illustrating the internal configuration of a portable terminal 100 in the contents open system 400 illustrated in FIG. 1.

FIG. 2 is a diagram illustrating the internal configuration of the portable terminal 100 in the contents open system 400 illustrated in FIG. 1.

The portable terminal 100 includes a photographing unit 1, an image processing unit 2, a sound collecting unit 3, a voice processing unit 4, a storing unit 5, a control unit 6, a network communication unit 7, a local wireless communication unit 8 that is an inter-portable terminal communication unit, an operation unit 9, a display unit 10, and voice playback unit 11.

The photographing unit 1 takes a picture of an object, using an optical system and a photographing device, under the control of the control unit 6.

The image processing unit 2 produces photograph data by performing an image process known in the art on a photograph signal outputted from the photographing device of the photographing unit 1.

The sound collecting unit 3 collects sounds through a microphone.

The voice processing unit 4 processes the sounds collected by the sound collecting unit 3.

The photographing unit 1, the image processing unit 2, the sound collecting unit 3, and the voice processing unit 4 are provided for implementing the photographing function of common digital cameras, and still image data, moving image data, and moving image data with voice may be produced by those units. The produced still image data, moving image data, and moving image data with voice are inputted to the control unit 6.

The control unit 6 generally controls all of the portable terminals 100. The control unit 6 is constituted of including a ROM where various programs required for the operation of the portable terminals 100 are stored and a processor executing the programs in the ROM. The control unit 6 stores the still image data, the moving image data, and the moving image data with voice into the memory unit 5, which may be a flash memory.

The network communication unit 7 is an interface for communicating with another portable terminal 100 or the image transmission log management server 200 in wireless connection with the mobile communication network 300, for example, under IMT2000. A communication interface, for example, following W-CDMA is used as the network communication unit 7.

The local wireless communication unit 8 is an interface for direct wireless communication with another portable terminal 100, without using the mobile communication network 300. A communication interface, for example, following Bluetooth is used as the local wireless communication unit 8.

The display unit 10 is constituted of a liquid crystal display panel or an organic EL panel. The display unit 10 displays various items of information, including the still image data and the moving image data stored in the storing unit 5, under the control of the control unit 6.

The sound playback unit 11 plays the accompanying voice of the moving image data with voice simultaneously with display of the moving image, when reproducing the moving image data with voice stored in the storing unit 5.

The operation unit 9 is constituted of, for example a touch panel, and inputs a signal to the control unit 6 in response to a touch operation of the user of the portable terminal 100.

Figure 3:
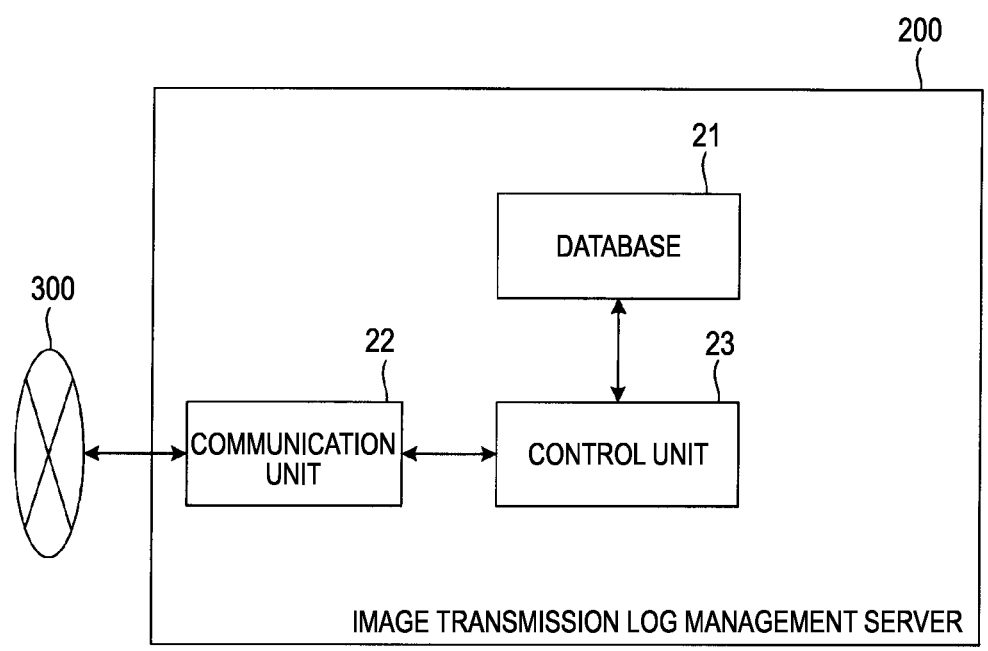
FIG. 3 is a diagram illustrating the internal configuration of an image transmission log management server 200 in the contents open system 400 illustrated in FIG. 1.

FIG. 3 is a diagram illustrating the internal configuration of the image transmission log management server 200 in the contents open system 400 illustrated in FIG. 1.

The image transmission log management server 200 includes a communication unit 22 that is constituted of an interface for communication with the portable terminal 100, using the network 300, a control unit 23 having a processor executing programs as a main component, and a database 21 for recording various items of information transmitted from the portable terminal 100.

The database 21 is supposed to be placed where the control unit 23 of the image transmission log management server 200 may access, and may be disposed outside the image transmission log management server 200.

The flow of service executed by the contents open system 400 having this configuration will be described. In order to provide with the service, the user of the portable terminal 100 installs an application program (terminal program) in the portable terminal 100, using the mobile communication network or a personal computer at his/her home. The terminal program is executed by the control unit 6.

An application program (server program) for providing the service is installed in the image transmission log management server 200. The server program is executed by the control unit 23. The operation of the portable terminal 100 by the terminal program and the operation of the image transmission log management server 200 by the server program will be described hereafter.

Figure 4:
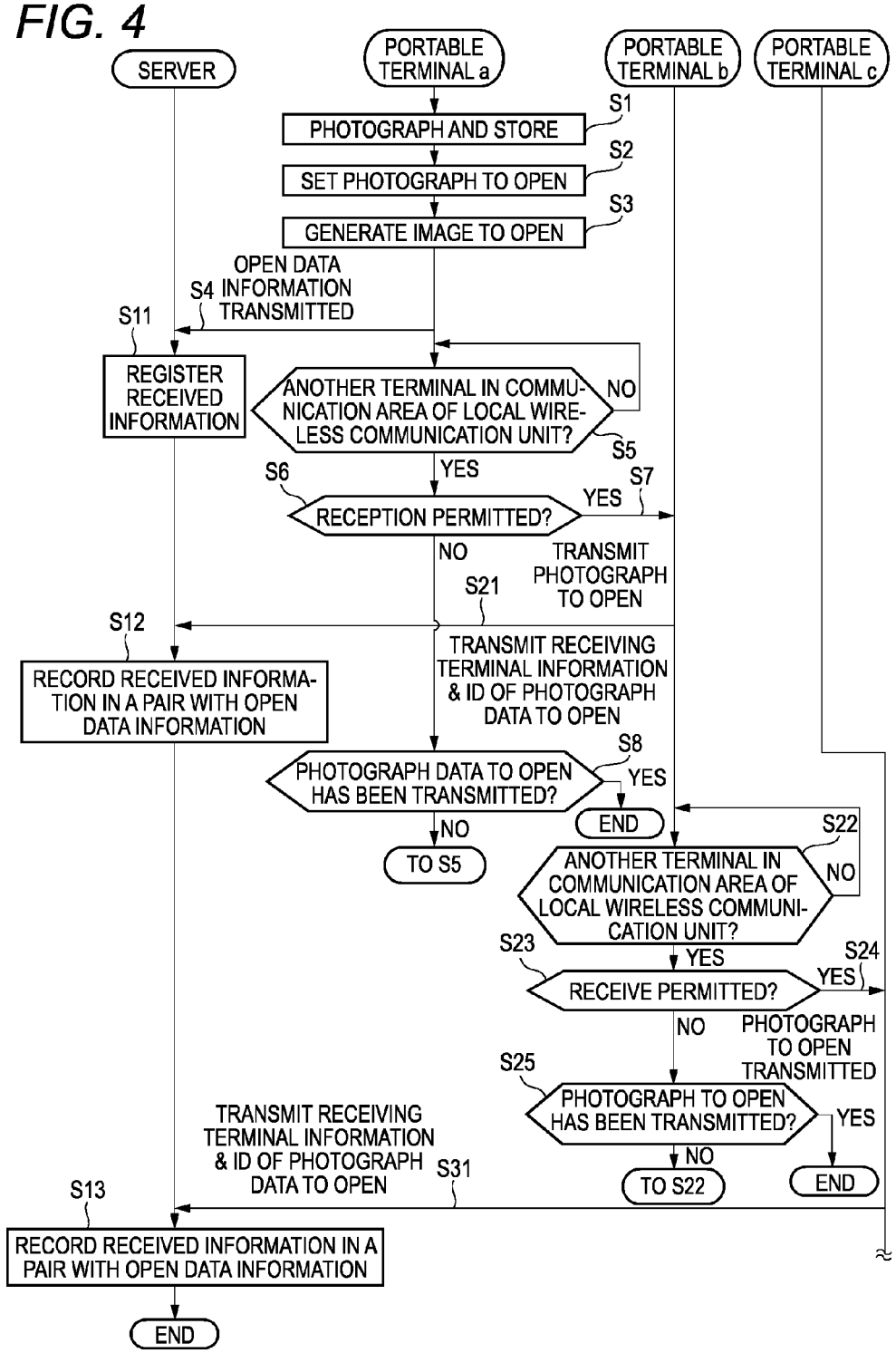
FIG. 4 is a flowchart illustrating the operation of the contents open system 400 illustrated in FIG. 1.

FIG. 4 is a flowchart illustrating the operation of the contents open system 400 illustrated in FIG. 1. FIG. 4 illustrates the operation when one of a plurality of the portable terminals 100 is assigned as a portable terminal a and the user of the portable terminal a opens still image data taken with the portable terminal a to several non-specific people.

When the user of the portable terminal a gives in instruction of photographing by operating the operation unit 9 of the portable terminal a, the photographing unit 1 of the portable terminal a photographs, and photograph data is produced from a photograph signal obtained by the photographing and stored in the storing unit 5 (step S1).

Next, the user of the portable terminal a sets the photograph data stored in the storing unit 5 as data to be opened, through the operation unit 9 (step S2). After this operation, the control unit 6 of the portable terminal a produces a copy of the photograph data as photograph data to be opened (step S3).

Next, the control unit 6 of the portable terminal a transmits the information (open data information) on the photograph data to be opened generated in step S3 to the image transmission log management server 200 by controlling the network communication unit 7 (step S4).

The open data information includes at least an ID for specifying the photograph data to be opened. The open data information may include, as information other than the ID, information such as a thumbnail data of the photograph data to be opened, the date of sending the ID of the photograph data to be opened to a server, the date of making the photograph data to be opened, the information about the maker of the photograph data to be opened, and the conditions of making the photograph data to be opened.

For the thumbnail data and the making date of the photograph data to be opened, the information attached to the header of the photograph data to be opened may be used as it is. The information about the maker of the photograph data to be opened and the information about the conditions of making the photograph data to be opened may be obtained by making the user of the portable terminal a input the information.

When receiving the open data information from the portable terminal a, the control unit 23 of the image transmission log management server 200 registers the received open data information on the database 21 (step S11).

The control unit 6 of the portable terminal a determines whether another portable terminal 100 is in the communication area of the local wireless communication unit 8 (step S5), after making the open data information be transmitted to the image transmission log management server 200.

As the result of determination in step S5, when another portable terminal 100 (for example, the portable terminal b) is in the communication area of the local wireless communication unit 8, the control unit 6 of the portable terminal a determines whether the portable terminal b has been set to receive the photograph data to be opened (step S6).

Whether to be able to receive photograph data to be opened from another portable terminal 100 may be set in the portable terminal 100 by a user and the information on whether to be able to receive is managed by the control unit 6.

The control unit 6 of the portable terminal a requests the control unit 6 of the portable terminal b in the communication area of the local wireless communication unit 8 to transmit the information on whether to be able to receive, and determines whether to receive photograph data to be opened has been set in the portable terminal b on the basis of the information on whether to receive transmitted in accordance with the request.

As the result of determination in step S6, when the portable terminal b has been set to receive photograph data to be opened, the control unit 6 of the portable terminal a controls the local wireless communication unit 8 to transmit the photograph data to be opened and the ID of the photograph data to be opened to the portable terminal b (step S7).

As the result of determination in step S6, when the portable terminal b is not set to receive photograph data to be opened, the control unit 6 of the portable terminal a determines whether the photograph data to be opened finishes being transmitted in step S8, and ends the process when the transmission is finished, and returns the process to the step S5 when the transmission is not finished.

The control unit 6 of the portable terminal b receiving the photograph data to be opened transmitted from the portable terminal a in step S7 stores the photograph data to be opened to the storing unit 5. Further, the control unit 6 of the portable terminal b generates the information on the corresponding terminal (receiving terminal information) and transmits the receiving terminal information and the ID of the photograph data to be opened to the image transmission log management server 200 by controlling the network communication unit 7 (step S21).

The receiving terminal information, for example, includes the date of receiving the photograph data to be opened and the information on the user B of the portable terminal b (name, sex, age, profile, a face photograph, and an avatar).

The information on the user B is inputted and stored in the storing unit 5 by the user, as a default when a terminal program is installed in the portable terminal b.

In the image transmission log management server 200 receiving the receiving terminal information and the ID of the photograph data to be opened from the portable terminal b, the control unit 23 records the open data information including the received ID of the photograph data to be opened and the receiving terminal information in a pair on the database 21 (step s12).

The control unit 6 of the portable terminal b makes the receiving terminal information and the ID of the photograph data to be opened be transmitted to the image transmission log management server 200, and then determines whether there is another portable terminal 100 in the communication area of the local wireless communication unit 8 of the corresponding terminal, after a predetermined standby time set to read the photograph data to be opened (step S22).

As the result of determination in step S22, when another portable terminal 100 (for example, the portable terminal c) is in the communication area of the local wireless communication unit 8, the control unit 6 of the portable terminal b determines whether the portable terminal c has been set to receive the photograph data to be opened (step S23).

As the result of determination in step S23, when the portable terminal c has been set to receive photograph data to be opened, the control unit 6 of the portable terminal b generates a copy of the photograph data to be opened stored in the storing unit 5 and stores the copy in the storing unit 5. Thereafter, the control unit 6 of the portable terminal b makes the photograph data to be opened and the ID of the photograph data to be opened be transmitted to the portable terminal c by controlling the local wireless communication unit 8 (step S24).

In the copy of the photograph data to be opened, a flag for forbidding transmission to another portable terminal 100 is added to the header.

The flag enables the user of the portable terminal 100 to prevent the photograph data to be opened from being transmitted to another portable terminal 100, by setting the photograph data to be opened received from another portable terminal 100, as an own photograph data.

As the result of determination in step S23, when the portable terminal c is not set to receive photograph data to be opened, the control unit 6 of the portable terminal b determines whether the photograph data to be opened finishes being transmitted in step S25, and ends the process when the transmission is finished, and returns the process to the step S22 when the transmission is not finished.

In the portable terminal c receiving the photograph data to be opened and the ID of the photograph data to be opened from the portable terminal b, the control unit 6 controls the network communication unit 7 to transmit the ID of the photograph data to be opened and the receiving terminal information about the corresponding terminal to the image transmission log management server 200 (step S31).

In the image transmission log management server 200 receiving the receiving terminal information and the ID of the photograph data to be opened from the portable terminal c, the control unit 23 records the open data information including the received ID of the photograph data to be opened and the receiving terminal information in a pair on the database 21 (step s13).

Figure 5:
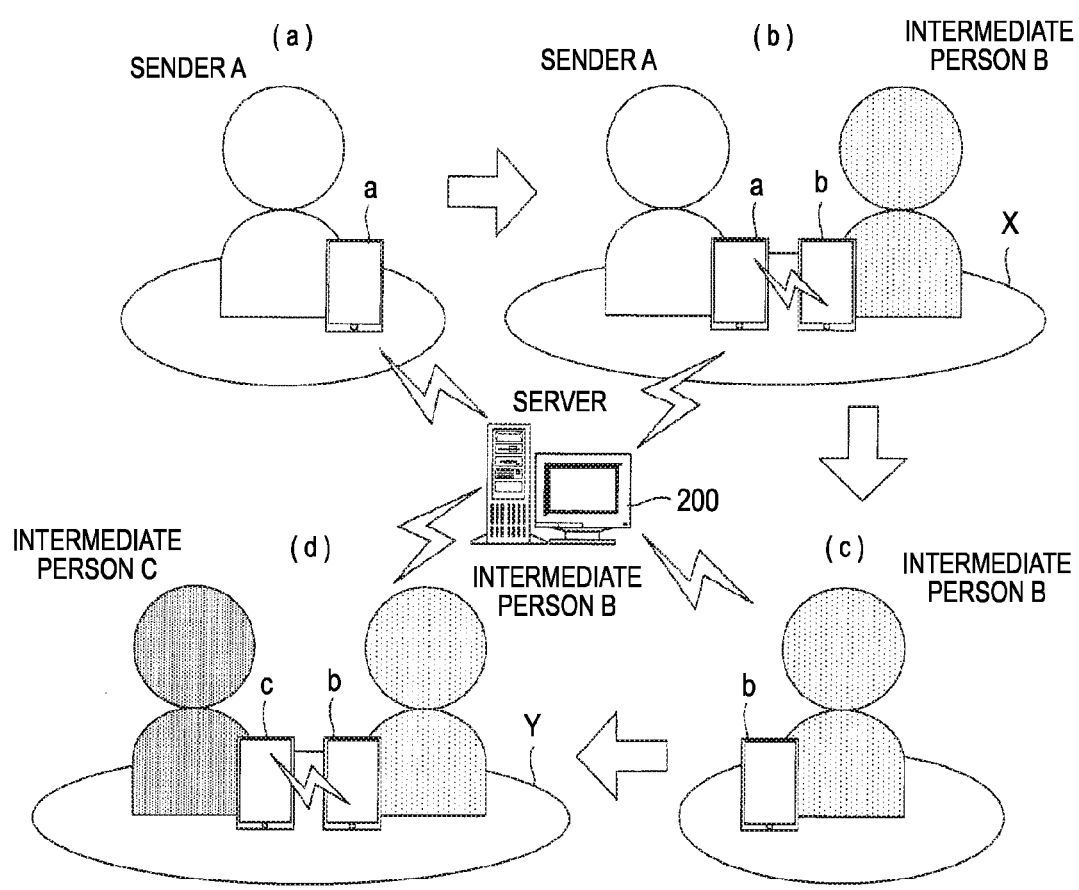
FIG. 5 is an image diagram illustrating the operation of the contents open system 400 which corresponds to the flowchart illustrated in FIG. 4.

FIG. 5 is an image diagram illustrating the operation of the contents open system 400 which corresponds to the flowchart illustrated in FIG. 4.

When the user A (sender) of the portable terminal a sets to open the photograph data stored in the storing unit 5, open data information about the photograph data to be opened is transmitted to the image transmission log management server 200 (Part (a) of FIG. 5).

Thereafter, when the portable terminal b set to receive photograph data to be opened enters the communication area X of the local wireless communication unit 8 of the portable terminal a, photograph data to be opened and the ID thereof are transmitted to the portable terminal b from the portable terminal a (Part (b) of FIG. 5).

The ID of the photograph data to be opened and the receiving terminal information are transmitted to the image transmission log management server 200 from the portable terminal b receiving the photograph data to be opened and the ID thereof (Part (c) of FIG. 5).

Thereafter, when the portable terminal c set to receive photograph data to be opened enters the communication area Y of the local wireless communication unit 8 of the portable terminal b, photograph data to be opened and the ID thereof are transmitted to the portable terminal c from the portable terminal b.

Thereafter, the ID of the photograph data to be opened and the receiving terminal information are transmitted to the image transmission log management server 200 from the portable terminal c receiving the photograph data to be opened and the ID thereof (Part (d) of FIG. 5).

As described above, in the contents open system 400, the ID of the photograph data to be opened and the receiving terminal information are transmitted to the image transmission log management server 200 from another portable terminal 100, every time photograph data to be opened is transmitted to another portable terminal 100 from the portable terminal 100 receiving the photograph data to be opened. Further, the receiving terminal information is recorded on the database 21 of the image transmission log management server 200.

Further, the control unit 23 of the image transmission log management server 200 has a function of processing the information recorded on the database 21 in a pair with the requested photograph data to be opened, and of returning the information to the portable terminal 100, in a request from the portable terminal 100.

In detail, when there is a request for transmitting the information on the photograph data to be opened which has a certain ID from the portable terminal 100, the control unit 23 of the image transmission log management server 200 returns the open data information including the certain ID and the information about the sum of the list of all items of receiving terminal information corresponding to the open data information to the portable terminal 100 that has made the request.

Figure 6:
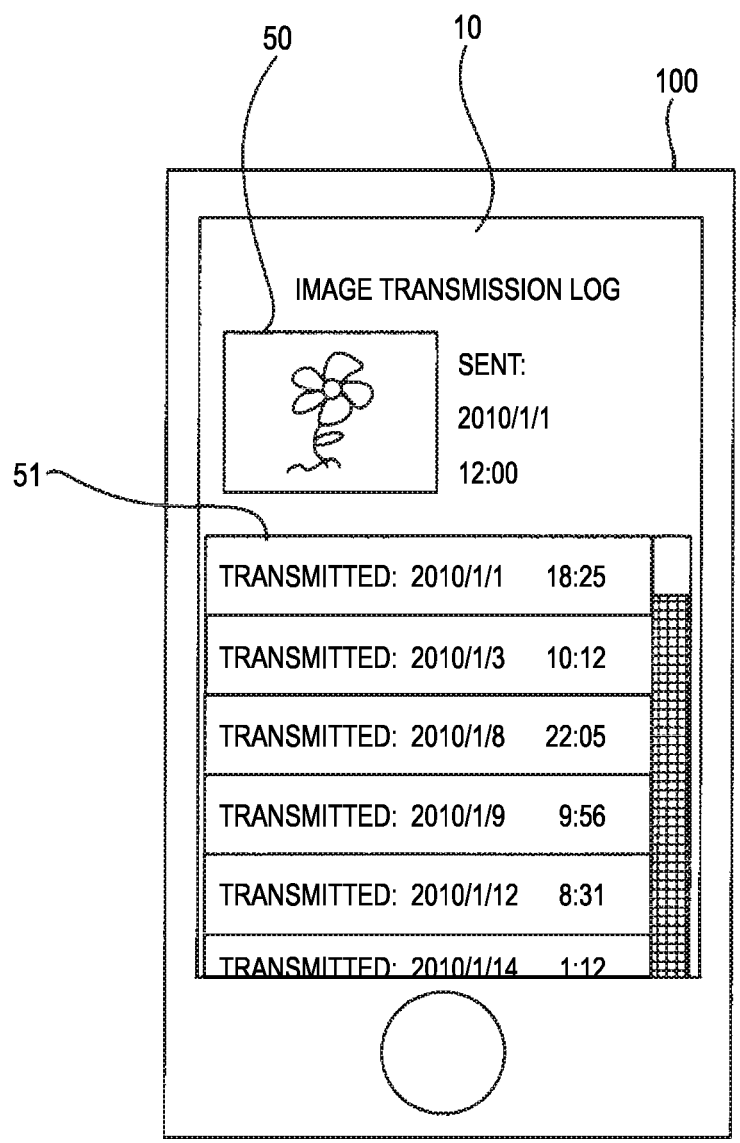
FIG. 6 is a diagram illustrating an example of an image displayed on a display unit of the portable terminal 100 in the contents open system 400 illustrated in FIG. 1.

FIG. 6 is a diagram illustrating an example of an image displayed on a display unit of the portable terminal 100 in the contents open system 400 illustrated in FIG. 1.

As illustrated in FIG. 6, on the display unit 10 of the portable terminal 100, the date of sending the thumbnail data included in the open data information and the image transmission log management server 200 of the open data information is displayed, and simultaneously, the information on the date of receiving the photograph data to be opened is displayed in time series, as receiving terminal information corresponding to the open data information.

The data for displaying the picture illustrated in FIG. 6 may be generated by the control unit 23 of the image transmission log management server 200 and then returned to the portable terminal 100, or may be generated from the open data information and the receiving terminal information received by the control unit 6 of the portable terminal 100 from the image transmission log management server 200.

The user of the portable terminal 100 generating the photograph data to be opened may know how many people the photograph data, which he/she has opened, has been transmitted to and how long it has taken to transmit the data, by seeing the picture illustrated in FIG. 6.

The user may see the process of transmitting photograph data to be opened, by not only transmitting the photograph data to be opened between portable terminals 100 but collecting the information according to the transmission event (receiving terminal information) to the image transmission log management server 200, as described above. Therefore, it is possible to simply open contents on several non-specific portable terminals and to provide a new image communication service that may provide useful information for the person who has opened the contents.

On the other hand, the timing when the control unit 6 of the portable terminal 100 receiving the photograph data to be opened transmits the receiving terminal information about the corresponding terminal and the ID of the photograph data to be opened to the image transmission log management server 200 is not limited to the point of time when receiving the photograph data to be opened.

For example, the control unit 6 of the portable terminal 100 receiving the photograph data to be opened may transmit the receiving terminal information and the ID of the photograph data to be opened to the image transmission log management server 200 at the point of time when the photograph data to be opened is played (displayed on the display unit 10) by operation of the user. In this case, the information on the date of playing the photograph data to be opened is included in the receiving terminal information, instead of the date of receiving the photograph data to be opened.

Alternatively, the control unit 6 of the portable terminal 100 receiving the photograph data to be opened may transmit the receiving terminal information and the ID of the photograph data to be opened to the image transmission log management server 200 at the point of time when transmitting the photograph data to be opened to another portable terminal 100. In this case, the information on the date of transmitting the photograph data to be opened is included in the receiving terminal information, instead of the date of receiving the photograph data to be opened.

As described above, the control unit 6 of the portable terminal 100 receiving the photograph data to be opened has only to make the receiving terminal information and the ID of the photograph data to be opened to the image transmission log management server 200, at the point of time when predetermined conditions for the photograph data to be opened (reception of the photograph data to be opened, play of the photograph data to be opened, and transmission of the photograph data to be opened) are satisfied.

Further, in the portable terminal 100, the control unit 6 may limit transmission in accordance with transmission conditions by allowing the user to input the transmission conditions through the operation unit 9.

The transmission conditions may be, for example, the number of photograph data to be opened which may be simultaneously transmitted/received and the maximum number of photograph data to be opened which may be received within a predetermined period. Accordingly, at the time of being transmitted/received, transmission of a large amount of information at a time is limited, such that each user may transmit photograph data to be opened with preferable frequency.

Further, the properties (sex, age, hobby, favorite genre of image, and favorite genre of music) of the user of the portable terminal 100 receiving the photograph data to be opened may be included in the transmission conditions. Accordingly, it is possible to select the object to receive the photograph data to be opened, in accordance with the properties of the user of the transmitting portable terminal 100.

For example, when the photograph data to be opened is a scenery image, the data is permitted to be transmitted only to portable terminals 100 where the desired image genre is set as "scenery". Accordingly, the users of the portable terminal 100 may easily receive the photograph data to be opened of his/her desirable genre, such that the quality of service may be improved.

Figure 7:
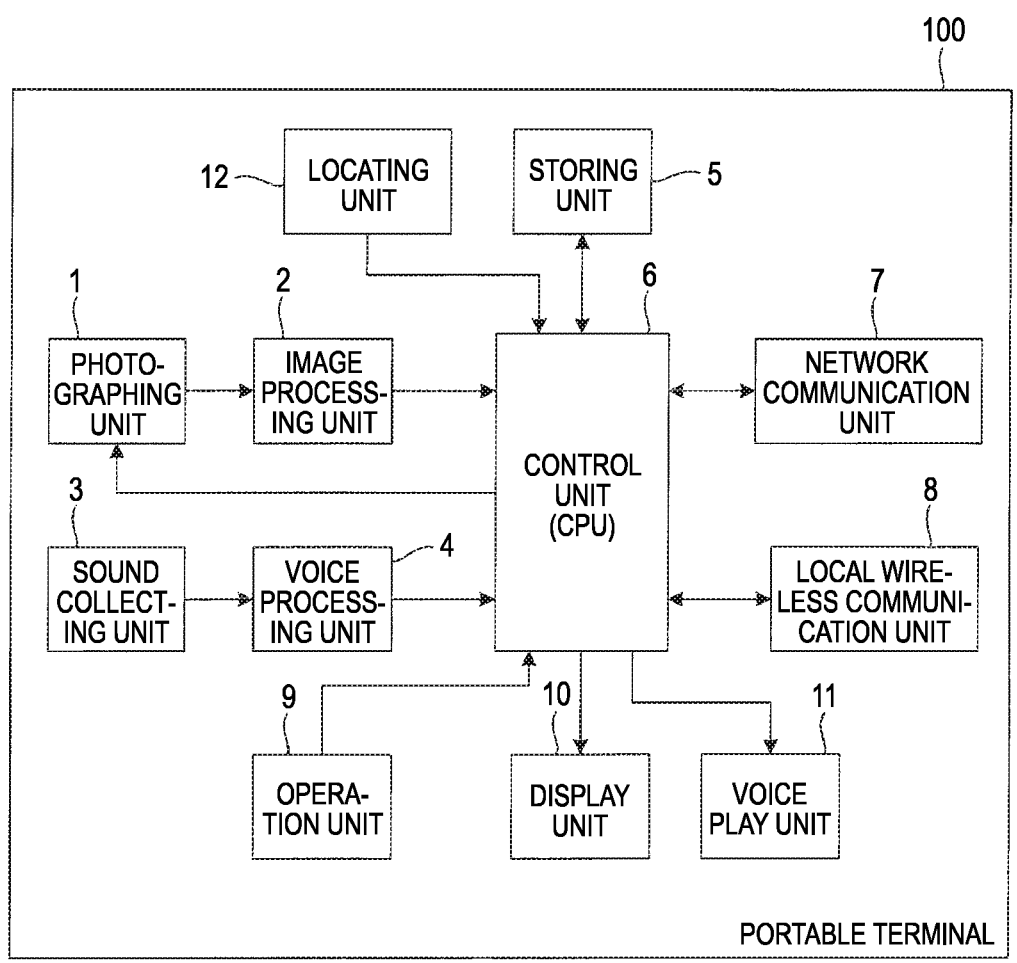
FIG. 7 is a diagram illustrating a modified example of the portable terminal 100 in the contents open system 400 illustrated in FIG. 1.

FIG. 7 is a diagram illustrating a modified example of the portable terminal 100 in the contents open system 400 illustrated in FIG. 1. The same components as those in FIG. 2 are given the same reference numerals in FIG. 7.

The portable terminal 100 illustrated in FIG. 7 has the same configuration as in FIG. 2, except that a locating unit 12 is added.

The locating unit 12, which detects the position (latitude and longitude etc.) of the portable terminal 100, may be a GPS (Global Positioning System) receiver, for example. The position information detected by the locating unit 12 is appropriately obtained by the control unit 6.

In the contents open system 400 using the portable terminal 100 illustrated in FIG. 7, the control unit 6 of the portable terminal 100 includes the position information of the portable terminal 100 relating to the photograph data to be opened into the receiving terminal information and the open data information received to the image transmission log management server 200.

The position information of the portable terminal 100 relating to the photograph data to be opened, which is included in the open data information, is the position information of the portable terminal 100, at the point of time when the open data information is transmitted to the image transmission log management server 200 or the photograph data to be opened is generated.

The position information of the portable terminal 100 relating to the photograph data to be opened, which is included in the receiving terminal information, is the position information of the portable terminal 100, when predetermined conditions for photograph data to be opened are satisfied (when the photograph data to be opened is receive, when the photograph data to be opened is played, or when the photograph data to be opened is transmitted).

When there is a request from the portable terminal 100, the control unit 23 of the image transmission log management server 200 in the contents open system 400 using the portable terminal 100 illustrated in FIG. 7 returns the information of mapping in time series the position information, which is included in the open data information and the receiving terminal information corresponding to the requested photograph data to be opened, to the portable terminal 100.

Figure 8:
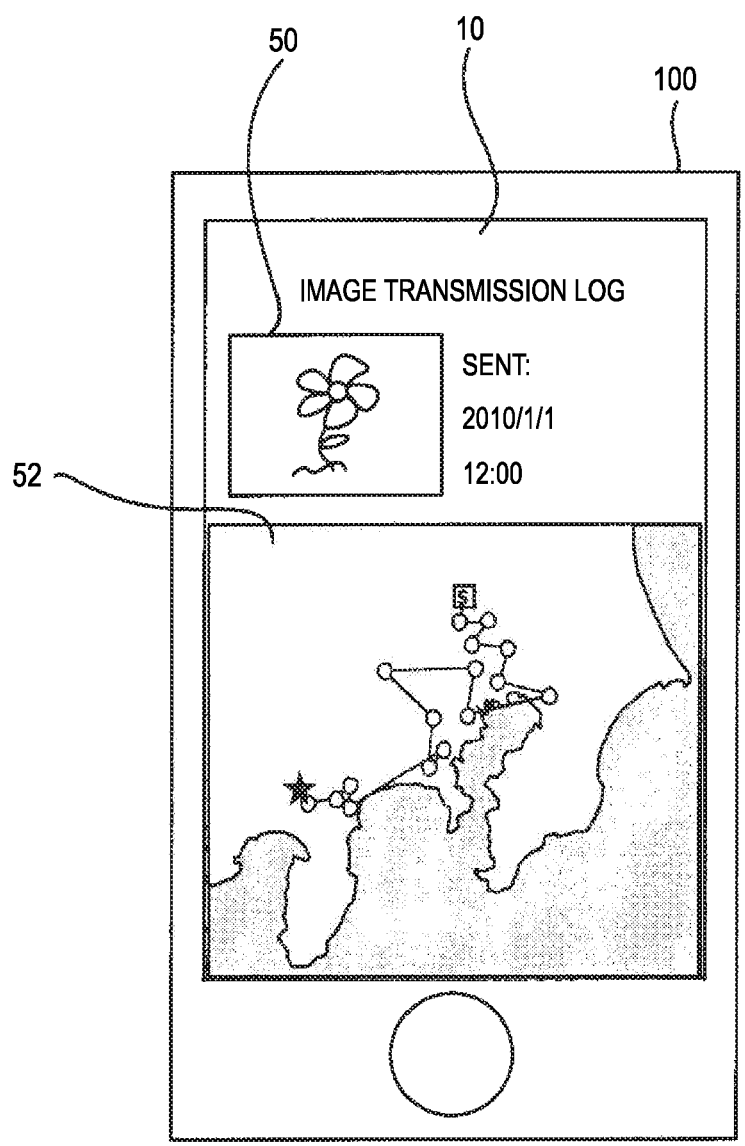
FIG. 8 is a diagram illustrating an example of an image displayed on a display unit of the portable terminal 100 in the contents open system 400 including the portable terminal illustrated in FIG. 7.

For example, the control unit 23 of the image transmission log management server 200 returns the picture illustrated in FIG. 8 to the portable terminal 100.

As illustrated in FIG. 8, on the display unit 10 of the portable terminal 100, the date of sending the thumbnail data 50 included in the photograph data to be opened and the open data information to the image transmission log management server 200 is displayed, and simultaneously, a mark (a rectangular with S therein) indicating the position information included in the open data information and circular marks indicating the position information included in the receiving terminal information corresponding to the open data information are floated on the map. Further, the marks indicating the position information are linked by straight lines in the order of registration on the database 21 so that the order of registering the position information on the database 21 of the image transmission log management server 200 may be seen.

According to the picture illustrated in FIG. 8, the user of the portable terminal 100 generating the photograph data to be opened may intuitionally know along which path the photograph data opened by him/her is being transmitted, so the service may improve convenience.

The data for displaying the picture illustrated in FIG. 8 may be generated by the control unit 23 of the image transmission log management server 200 and then returned to the portable terminal 100, or may be generated from the open data information and the receiving terminal information received by the control unit 6 of the portable terminal 100 from the image transmission log management server 200. When the photograph data of FIG. 8 is generated in the portable terminal 100, the portable terminal 100 may obtain the data on the map from another place through the network communication unit 7.

In the contents open system 400 described above, the portable terminal 100 may be provided with a function of being able to input a comment for the received photograph data to be opened so that the portable terminal may transmit the data of the comment to the image transmission log management server 200.

To be specific, the control unit 6 of the portable terminal 100 transmits the data of a comment inputted through the operation unit 9 for the photograph data to be opened, which has been set to be opened by another portable terminal 100, to the image transmission log management server 200, with the ID of the photograph data to be opened.

The control unit 23 of the image transmission log management server 200 records the data of the comment transmitted from the portable terminal 100 on the database 21, in a pair with the open data information including the ID of the photograph data to be opened transmitted with the comment.

When the portable terminal 100 makes a request for reading the comment, the control unit 23 of the image transmission log management server 200 returns the list of the data of the comment, which corresponds to the open data information including the ID of the requested photograph data to be opened, to the portable terminal 100.

Figure 9:
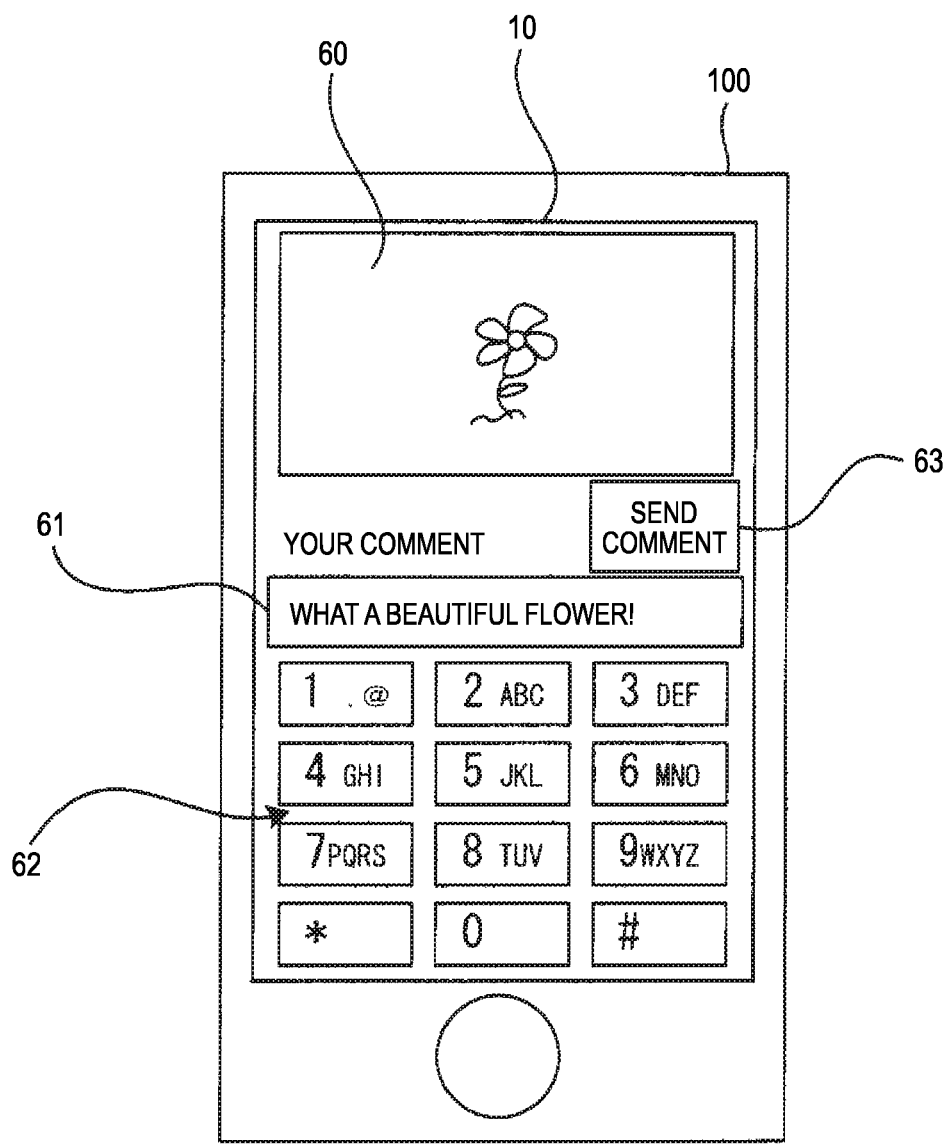
FIG. 9 is a diagram illustrating an example of an image displayed on a display unit of the portable terminal 100 in the contents open system 400 illustrated in FIG. 1.

For example, the control unit 6 of the portable terminal 100 displays the picture illustrated in FIG. 9 on the display unit 10, when playing the photograph data to be opened.

Photograph data to be opened 60, a comment input blank 61, a software keyboard 62, and a comment sending button 63 are displayed on the display unit 10.

When the user inputs a comment through the software keyboard 62, the control unit 6 puts the comment into the comment input blank 61. When the user presses the comment sending button 63, the control unit 6 transmits the data of the input comment and the ID of the photograph data to be opened 60 to the image transmission log management server 200 through the network communication unit 7.

Figure 10:
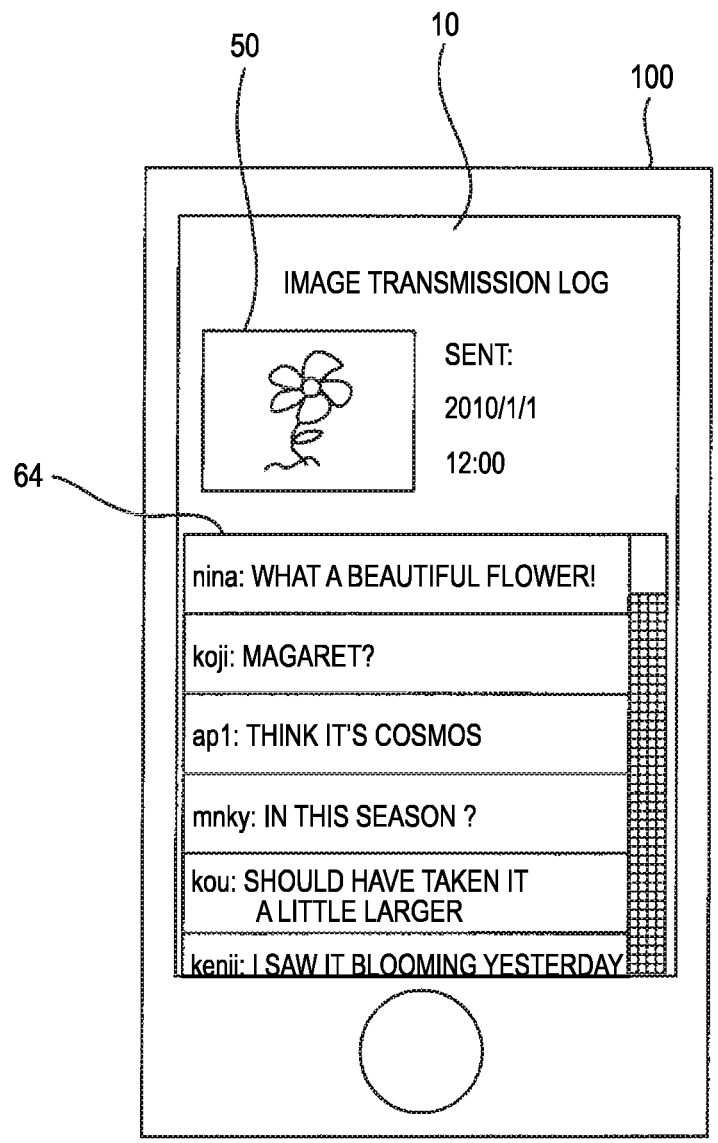
FIG. 10 is a diagram illustrating an example of an image displayed on a display unit of the portable terminal 100 in the contents open system 400 illustrated in FIG. 1.

When the list of the comment for the photograph data to be opened which has a certain ID is requested from the portable terminal 100, as illustrated in FIG. 10, the control unit 23 of the image transmission log management server 200 transmits the list information 64 of the data of the comment corresponding to the open data information including the ID of the requested photograph data to be opened to the portable terminal 100.

As described above, as the list of the comment for the photograph data to be opened may be read from the portable terminal 100, more pleasant service may be provided.

The data for displaying the picture illustrated in FIG. 10 may be generated by the control unit 23 of the image transmission log management server 200 and then returned to the portable terminal 100, or may be generated from the open data information and the receiving terminal information received by the control unit 6 of the portable terminal 100 from the image transmission log management server 200.

Further, the control unit 23 of the image transmission log management server 200 may return the information corresponding to the open data information or information obtained by processing the information, only for the portable terminal 100 transmitting the data of a comment. Accordingly, it is possible to urge the user of the portable terminal 100 to input a comment, such that the value added of the entire service may be improved.

Further, the control unit 6 of the portable terminal 100 may store a copy of the photograph data to be opened in the storing unit 5, only when a comment is inputted for the photograph data to be opened in transmission of the photograph data to be opened to another portable terminal 100 and the data of the comment is transmitted to the image transmission log management server 200.

Accordingly, a copy of the photograph data to be opened is not stored in the portable terminals 100 of users who did not input a comment, such that it is possible to urge a user to input a comment and the value added of the entire service may be improved.

Further, the control unit 6 of the portable terminal 100 may transmit the receiving terminal information relating to the corresponding terminal too to another portable terminal 100, when transmitting the photograph data to be opened and the ID thereof to the another portable terminal 100.

Figure 11:
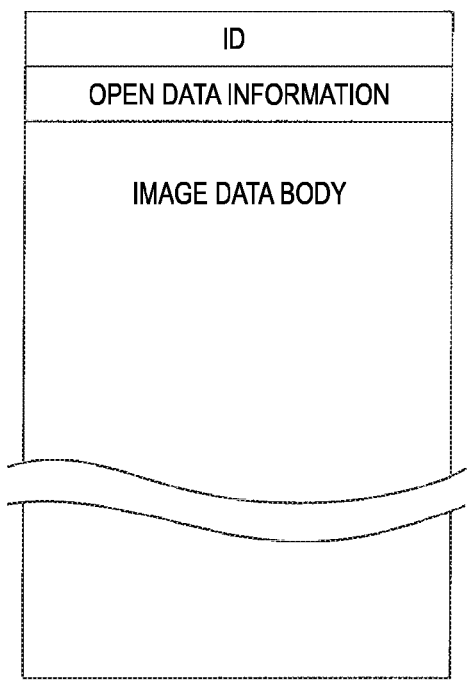
FIG. 11 is a diagram illustrating an example the structure of data transmitted and received between the portable terminals 100 in the contents open system 400 illustrated in FIG. 1.
Figure 11:
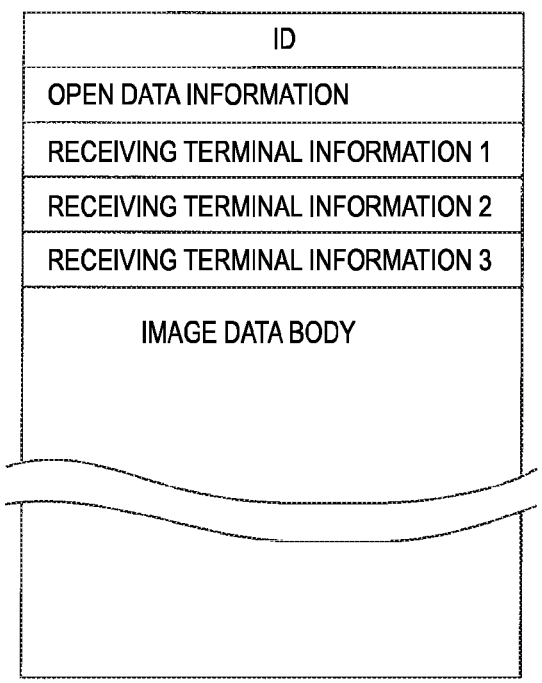

For example, the photograph data to be opened transmitted to another portable data 100 from the portable terminal 100 generating the photograph data to be opened is set as data including an ID and open data information in the header, as illustrated in Part (a) of FIG. 11.

Further, the control unit 6 of the portable terminal 100 adds the receiving terminal information relating to the corresponding terminal to the header of photograph data to be opened and then transmits the photograph data to be opened, as illustrated in Part (b) of FIG. 11, when transmitting the photograph data to be opened from the corresponding terminal to another terminal.

Accordingly, the receiving terminal information of the portable terminal 100 transmitting photograph data to be opened is added to the header every time the photograph data to be opened is transmitted (Part (b) of FIG. 11). The control unit 6 of the portable terminal 100 generates and displays the information illustrated in FIG. 6 or 8 on the display unit 10 from the receiving terminal information included in the header of the received photograph data to be opened.

Accordingly, the user of the portable terminal 100 may check the information on the transmission situation of the photograph data to be opened even without accessing the image transmission log management server 200.

According to this configuration, since it is not necessary to access the image transmission log management server 200, it is possible to check information even under an environment that it is impossible to access to the mobile communication network 300, such the convenience may be improved. Further, it is possible to quickly refer to information in comparison to access to the image transmission log management server 200.

When the receiving terminal information recorded in a pair with the open data information satisfy a specific condition, the control unit 23 of the image transmission log management server 200 in the contents open system 400 may notifies the portable terminal 100 transmitting the open data information of satisfaction of the specific condition.

The specific condition is satisfied, for example, when the recording number of the receiving terminal information corresponding to the open data information reaches a predetermined value (e.g. 1000), when the position information of the portable terminal 100 is included in the receiving terminal information and is beyond the boundary, and when the photograph data to be opened specified by the ID included in the open data information is deleted from the system.

Figure 12:
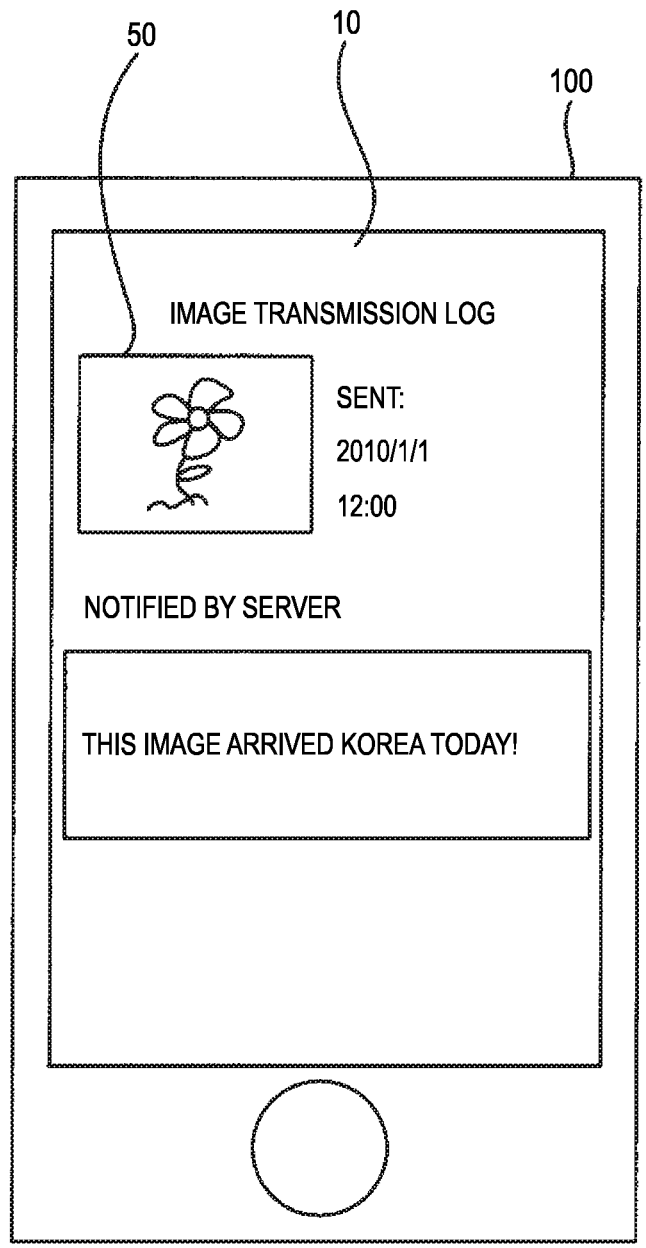
FIG. 12 is a diagram illustrating an example of an image displayed on a display unit of the portable terminal 100 in the contents open system 400 illustrated in FIG. 1.

When the specific condition is satisfied, the control unit 23 of the image transmission log management server 200 generates, for example, the mail data illustrated in FIG. 12 and transmit the mail data to the portable terminal 100, in a way of pushing.

In FIG. 12, information saying that photograph data to be opened 50 arrived at Korea is displayed on the display unit 10, together with the photograph data to be opened 50 and the sending date. It is possible to exhibit the memorial timing of the data opened by the user generating the photograph data to be opened, by pushing the information, such that the value added may be given to the service.

In the contents open system 400, when determining that the photograph data to be opened which has been set to be opened by another terminal, by the user operating the corresponding terminal is not suitable for opening, the control unit 6 of the portable terminal 100 transmits unsuitableness report information to the image transmission log management server 200. Further, when there has been photograph data to be opened with the number of received unsuitableness report information above a critical value, the image transmission log management server 200 transmits deletion order information for the photograph data to be opened to portable terminals 100 that has received the photograph data to be opened. It is preferable for the control unit 6 of the portable terminals 100 receiving the deletion order information to delete the photograph data to be opened in the corresponding terminals in accordance with the deletion order information.

Figure 13:
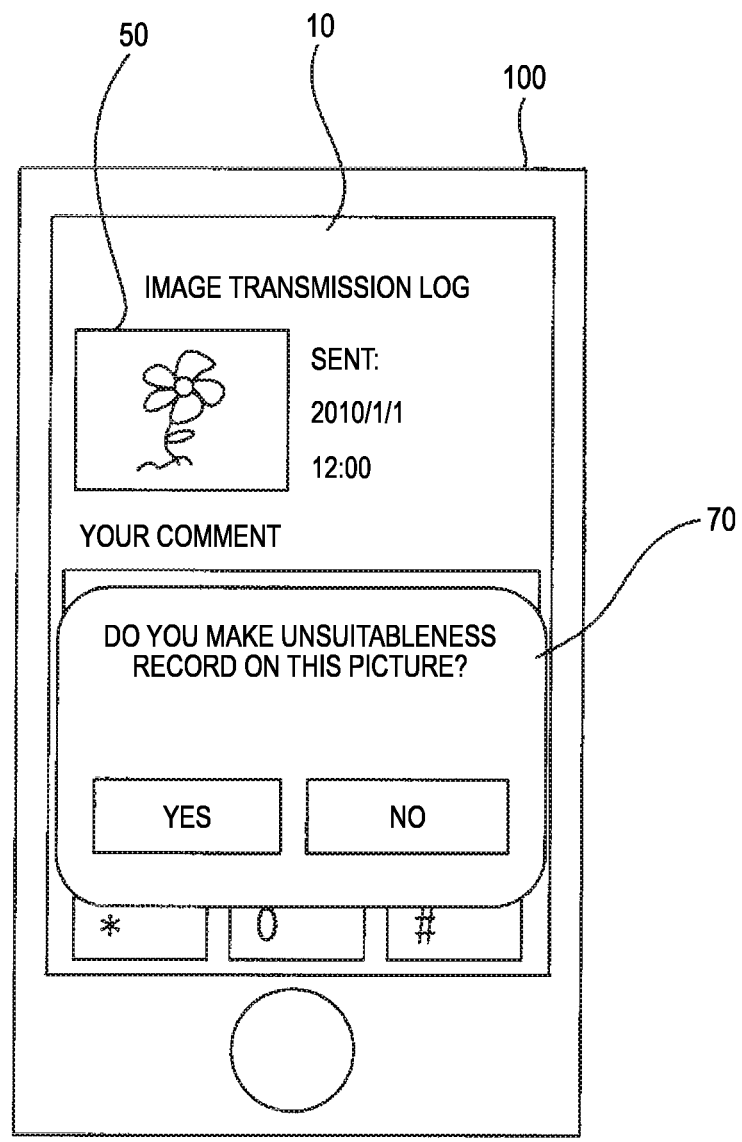
FIG. 13 is a diagram illustrating an example of an image displayed on a display unit of the portable terminal 100 in the contents open system 400 illustrated in FIG. 1.

For example, the control unit 6 of the portable terminal 100 overlap the message picture 70 illustrated in FIG. 13, in the play picture of the photograph data to be opened received from another terminal.

Software icons ("Yes", "No") are displayed in the message picture 70. When the icon "Yes" is pressed, the control unit 6 of the portable terminal 100 transmits the ID of the photograph data to be opened which is being played and unsuitableness report information saying that an unsuitableness report has been made for the photograph data to be opened, to the image transmission log management server 200 through the network communication unit 7.

When the number of unsuitableness report information transmitted for the ID of a specific photograph data to be opened is above a critical value, the control unit 23 of the image transmission log management server 200 specifies the addresses of the portable terminals 100 transmitting the receiving terminal information corresponding to the open data information including the ID to the communication log when receiving data information has been received. Further, the control unit transmits deletion order information to all of the portable terminals 100 transmitting the receiving terminal information.

When photograph data to be opened which is the object to be deleted is stored in the corresponding terminal, the control units 6 of the portable terminals 100 receiving the deletion order information delete the data.

According this configuration, when photograph data to be opened is not suitable to be opened, against public orders or public morals, the photograph data to be opened may be forcibly deleted from the system, such that the quality of the service may be improved.

On the other hand, the contents data opened by the contents open system 400 is not limited to image data or voice data, and for example, may be text data.

As described above, the followings are described in the specification.

It is disclosed a contents open system comprising a server and a plurality of portable terminals each having a network communication unit that communicates with the server through a mobile communication network, thereby opening contents data to several non-specific people using the plurality of portable terminals, wherein the plurality of portable terminals comprises: an inter-terminal communication unit configured to directly communicate with another portable terminal (hereafter, referred to as another terminal) without using the mobile communication network; a contents information transmission control unit configured to transmit contents information which is information on contents data set to be opened by a user of the corresponding terminal and includes the ID of the contents data, to the server; a first contents transmission control unit configured to, when another terminal is in the communication area of the inter-terminal communication unit, transmit the contents data set to be opened and the ID of the contents data to the another terminal in the communication area through the inter-terminal communication unit; a terminal information transmission control unit configured to receive content data set to be opened by another terminal and the ID of the contents data from another terminal through the inter-terminal communication unit, and then, when a predetermined condition for the received information are satisfied, transmit terminal information about the corresponding terminal and the ID of the received contents data to the server; and a second contents transmission control unit configured to, when another terminal is in the communication area of the inter-terminal communication unit in a state of receiving contents data set to be opened by another terminal, transmit the contents data and the ID of the contents data to the another terminal in the communication area through the inter-terminal communication unit, and the server comprises: a contents information registering unit configured to register the contents information transmitted from the portable terminal on a database; a terminal information recording unit configured to record the terminal information received from the portable terminal and the terminal information in the ID of the contents data on the database, in a pair with contents information including the same ID as the ID of the received contents data registered on the database; and an information returning unit configured to return information recorded on the database in a pair with requested contents data or information obtained by processing the information to the portable terminal, in accordance with a request from the portable terminal.

It is disclosed the contents open system, wherein the contents data is any one of still image data, moving image data, and moving image data with voice.

It is disclosed the contents open system, wherein the portable terminal further comprises a position information obtaining unit configured to obtain position information of the corresponding terminal from a locating unit that detects the position of the corresponding terminal, the contents information transmission control unit of the portable terminal transmits the position information of the portable terminal relating to the contents data set to be opened, which is included in the contents information, to the server, and the terminal information transmission control unit of the portable terminal transmits the position information of the portable terminal relating to the received contents data, which is included in the contents information, to the server.

It is disclosed the contents open system, wherein the information returning unit of the server returns the information of mapping the position information included in the terminal information corresponding to the requested contents data, in parallel in time series on a map, to the portable terminal in accordance with a request for reading the position information.

It is disclosed the contents open system, wherein the information returning unit of the server returns the position information included in the terminal information corresponding to the requested contents data to the portable terminal in accordance with a request for reading the position information, and the portable terminal further comprises a map display unit configured to display a picture of mapping the position information returned from the server in parallel in time series on a map, on a display unit.

It is disclosed the contents open system, wherein the portable terminal further comprises a comment transmission control unit configured to transmit the data of a comment, which is inputted for contents data set to be opened by another terminal, to the server, the server further comprises a comment recording control unit that records the data of the comment received from the portable terminal, in a pair with the ID of the contents data corresponding to the comment, on the database, and the information returning unit of the server returns the list of the data of the comment corresponding to requested contents data to the portable terminal, in accordance with a request for reading the data of the comment.

It is disclosed the contents open system, wherein the portable terminal further comprises a copy data recording control unit configured to generate and record a copy of the contents data on a recording medium, for contents data with the data of the comment transmitted to the server, and the copy data is added with information saying that the data cannot be transmitted to another terminal.

It is disclosed the contents open system, wherein the information returning unit of the server returns the formation only to a portable terminal that transmits the data of the comment.

It is disclosed the contents open system, wherein the first contents transmission control unit of the portable terminal additionally transmits the contents information together with the header of the contents data to the another terminal, and the second contents transmission control unit of the portable terminal additionally transmits the terminal information together with the header of the contents data to the another terminal.

It is disclosed the contents open system, wherein when the terminal information recorded in a pair with the contents information satisfies a specific condition, the server notifies the portable terminal transmitting the contents information of satisfaction of the specific condition.

It is disclosed the contents open system, wherein the portable terminal further comprises an unsuitableness record information transmission control unit configured to, when determining by the user operating the corresponding terminal that the contents data set to be opened by another terminal is not suitable for opening, transmit unsuitableness report information to the server, the server further comprises a deletion order information transmitting unit configured to, when there has been contents data having the number of the unsuitableness record information above a critical value, transmit delete order information of the contents data to the portable terminal receiving the contents data, and the portable terminal further comprises a contents data deleting unit configured to delete the contents data in the corresponding terminal in accordance with the deletion order information.

It is disclosed a portable terminal in the contents open system.

It is disclosed a server in the contents open system.

It is disclosed a portable program for functioning as each part other than the inter-terminal communication unit and the network communication unit of the portable terminal in the contents open system for a computer.

It is disclosed a server program for functioning as each part of the server in the contents open system for a computer.

INDUSTRIAL APPLICABILITY

According to the present invention, it is possible to provide a contents open system that may simply open contents to several non-specific portable terminals and provide a service that may provide useful information about the person who provides contents, and a portable terminal, a server, a terminal program, and a server program which are used in the system.

Although the present invention was described in detail with reference to specific embodiments, it is apparent to those skilled in the art that the present invention may be changed and modified in various ways without departing from the spirit and scope of the present invention.

This application is based on Japanese Patent Application (2011-80899), filed on Mar. 31, 2011, and the entire contents of which are incorporated herein by reference.

REFERENCE SIGNS LIST

100, a, b, c: Portable terminal
200: Image transmission log management server
300: Mobile communication network
400: Contents open system
6: Control unit
8: Local wireless communication unit

The invention claimed is:

1. A contents open system comprising a server and a plurality of portable terminals each having a network communication unit that communicates with the server through a mobile communication network, thereby opening contents data to several non-specific people using the plurality of portable terminals,
wherein each of the plurality of portable terminals comprises:
a communication interface having an inter-terminal communication unit configured to directly communicate with another portable terminal using near field communication without using the mobile communication network; and
a processor configured to function as:
a contents information transmission control unit configured to transmit contents information, which includes information on contents data set to be opened by a user of the portable terminal and an ID of the contents data, to the server;
a first contents transmission control unit configured to transmit the contents data set to be opened and the ID of the contents data to the another terminal through the inter-terminal communication unit;
a terminal information transmission control unit configured to receive content data set to be opened by another terminal and the ID of the contents data from another terminal through the inter-terminal communication unit, and then, when a predetermined condition for the received contents data is satisfied, transmit terminal information about the portable terminal and the ID of the received contents data to the server; and
a second contents transmission control unit configured to, when another terminal is in a state of receiving contents data set to be opened by another terminal, transmit the contents data and the ID of the contents data to the another terminal through the inter-terminal communication unit, and
the server comprises:
a memory storing a database; and a processor to function as:
a contents information registering unit configured to register the contents information transmitted from the portable terminal on the database;
a terminal information recording unit configured to record on the database, the terminal information and the ID of the contents data received from another terminal, together with contents information including the same ID as the ID of the received contents data registered on the database; and
an information returning unit configured to return information recorded on the database together with requested contents data or information obtained by processing the information to the portable terminal, in accordance with a request from the portable terminal.

2. The contents open system of claim 1, wherein the contents data is any one of still image data, moving image data, and moving image data with voice.

3. The contents open system of claim 1, wherein the portable terminal further comprises a position information obtaining unit configured to obtain position information of the portable terminal from a locating unit that detects the position of the portable terminal,
the contents information transmission control unit of the portable terminal transmits the position information of the portable terminal relating to the contents data set to be opened, which is included in the contents information, to the server, and
the terminal information transmission control unit of the portable terminal transmits the position information of the portable terminal relating to the received contents data, which is included in the contents information, to the server.

4. The contents open system of claim 3, wherein the information returning unit of the server returns the information of mapping the position information included in the terminal information corresponding to the requested contents data, in parallel in time series on a map, to the portable terminal in accordance with a request for reading the position information.

5. The contents open system of claim 3, wherein the information returning unit of the server returns the position information included in the terminal information corresponding to the requested contents data to the portable terminal in accordance with a request for reading the position information, and the portable terminal further comprises a map display unit configured to display a picture of mapping the position information returned from the server in parallel in time series on a map, on a display unit.

6. The contents open system of claim 1, wherein the processor of the portable terminal further functions as a comment transmission control unit configured to transmit the data of a comment, which is inputted for contents data set to be opened by another terminal, to the server,
the processor of the server further functions as a comment recording control unit that records the data of the comment received from the portable terminal, in a pair with the ID of the contents data corresponding to the comment, on the database, and
the information returning unit of the server returns the list of the data of the comment corresponding to requested contents data to the portable terminal, in accordance with a request for reading the data of the comment.

7. The contents open system of claim 6, wherein the processor of the portable terminal further functions as a copy data recording control unit configured to generate and record a copy of the contents data on a recording medium, for contents data with the data of the comment transmitted to the server, and
the copy data is added with information saying that the data cannot be transmitted to another terminal.

8. The contents open system of claim 6, wherein the information returning unit of the server returns the information only to a portable terminal that transmits the data of the comment.

9. The contents open system of claim 1, wherein the first contents transmission control unit of the portable terminal additionally transmits the contents information together with the header of the contents data to the another terminal, and the second contents transmission control unit of the portable terminal additionally transmits the terminal information together with the header of the contents data to the another terminal.

10. The contents open system of claim 1, wherein when the terminal information recorded in a pair with the contents information satisfies a specific condition, the server notifies the portable terminal transmitting the contents information of satisfaction of the specific condition.

11. The contents open system of claim 1, wherein the processor of the portable terminal further functions as an unsuitableness record information transmission control unit configured to, when determining by the user operating the portable terminal that the contents data set to be opened by another terminal is not suitable for opening, transmit unsuitableness report information to the server,
the processor of the server further functions as a deletion order information transmitting unit configured to, when there has been contents data having the number of the unsuitableness record information above a critical value, transmit delete order information of the contents data to the portable terminal receiving the contents data, and
the portable terminal further comprises a contents data deleting unit configured to delete the contents data in the portable terminal in accordance with the deletion order information.

12. A non-transitory computer readable medium storing a portable program causing a computer to function as each unit other than the inter-terminal communication unit and the network communication unit of the portable terminal in the contents open system of claim 1.

13. One of a plurality of portable terminals in a contents open system comprising a server and a plurality of portable terminals each having a network communication unit that communicates with the server through a mobile communication network, thereby opening contents data to several non-specific people using the plurality of portable terminals,
wherein the one of the plurality of portable terminals comprises:
a communication interface having an inter-terminal communication unit configured to directly communicate with another portable terminal using near field communication without using the mobile communication network; and
a processor configured to function as:
a contents information transmission control unit configured to transmit contents information, which includes information on contents data set to be opened by a user of the portable terminal and an ID of the contents data, to the server;
a first contents transmission control unit configured to transmit the contents data set to be opened and the ID of the contents data to the another terminal the communication area through the inter-terminal communication unit;
a terminal information transmission control unit configured to receive content data set to be opened by another terminal and the ID of the contents data from another terminal through the inter-terminal communication unit, and then, when a predetermined condition for the received contents data is satisfied, transmit terminal information about the portable terminal and the ID of the received contents data to the server; and
a second contents transmission control unit configured to, when another terminal is in a state of receiving contents data set to be opened by another terminal, transmit the contents data and the ID of the contents data to the another terminal through the inter-terminal communication unit, and the server comprises:

a memory storing a database; and a processor to function as:
- a contents information registering unit configured to register the contents information transmitted from the portable terminal on the database;
- a terminal information recording unit configured to record on the database, the terminal information and the ID of the contents data received from another terminal, together with contents information including the same ID as the ID of the received contents data registered on the database; and
- an information returning unit configured to return information recorded on the database together with requested contents data or information obtained by processing the information to the portable terminal, in accordance with a request from the portable terminal.

* * * * *